US008184022B2

(12) United States Patent
Scott

(10) Patent No.: US 8,184,022 B2
(45) Date of Patent: *May 22, 2012

(54) METHOD FOR AUTOMATICALLY PREFERRING A DIACRITICAL VERSION OF A LINGUISTIC ELEMENT ON A HANDHELD ELECTRONIC DEVICE BASED ON LINGUISTIC SOURCE AND ASSOCIATED APPARATUS

(75) Inventor: Sherryl Lee Lorraine Scott, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/229,805

(22) Filed: Sep. 12, 2011

(65) Prior Publication Data

US 2011/0316789 A1  Dec. 29, 2011

Related U.S. Application Data

(63) Continuation of application No. 11/558,542, filed on Nov. 10, 2006, now Pat. No. 8,035,534.

(51) Int. Cl.
*H03M 11/00* (2006.01)
*G06F 3/02* (2006.01)
(52) U.S. Cl. .......................... 341/22; 345/168
(58) Field of Classification Search .......... 345/168–172; 341/22–34
See application file for complete search history.

(56) References Cited

U.S. PATENT DOCUMENTS

| | | | |
|---|---|---|---|
| 6,307,548 B1 | 10/2001 | Flinchem et al. | |
| 2004/0093567 A1 | 5/2004 | Schabes et al. | |
| 2005/0108017 A1 | 5/2005 | Esser et al. | |
| 2005/0192802 A1* | 9/2005 | Robinson et al. | 704/240 |
| 2005/0198023 A1 | 9/2005 | James et al. | |
| 2005/0200609 A1 | 9/2005 | Van der Hoeven | |
| 2005/0283358 A1 | 12/2005 | Stephanick et al. | |
| 2005/0283364 A1 | 12/2005 | Longe et al. | |
| 2007/0085835 A1 | 4/2007 | Plestid et al. | |
| 2007/0156747 A1 | 7/2007 | Samuelson et al. | |
| 2007/0269776 A1 | 11/2007 | Fux et al. | |
| 2009/0137279 A1 | 5/2009 | Silfverberg | |

OTHER PUBLICATIONS

Michel Simard, Automatic Insertion of Accents in French Text, RALI, 1998.
Motorola, Inc.: "V525" Mobile Phone, 2003, The Motorola v525 mobile phone text input system; and Motorola, Inc.: "UG_Vodafone. V600.book", Internet Document, Oct. 2003.
Daniel Wigdor, Ravin Baladrishnan, "A Comparison of Consecutive and Concurrent Input Text Entry Techniques for Mobile Phones", Proceeding of CHI 2004, Apr. 24, 2004-Apr. 29, 2004.

\* cited by examiner

*Primary Examiner* — Samuel G Neway
(74) *Attorney, Agent, or Firm* — Finnegan, Henderson, Farabow, Garrett & Dunner, LLP

(57) ABSTRACT

A method for automatically preferring a diacritical version of a linguistic element on a handheld electronic device by utilizing a linguistic source.

18 Claims, 4 Drawing Sheets

METHOD FOR AUTOMATICALLY PREFERRING A DIACRITICAL VERSION OF A LINGUISTIC ELEMENT ON A HANDHELD ELECTRONIC DEVICE BASED ON LINGUISTIC SOURCE AND ASSOCIATED APPARATUS

This is a continuation of application Ser. No. 11/558,542, filed Nov. 10, 2006, which is incorporated herein by reference.

BACKGROUND

1. Technical Field

The disclosed and claimed concept relates generally to handheld electronic devices and, more particularly, to a method of enabling input on a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keypad" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keypads have included other arrangements of keys, letters, symbols, digits, and the like.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While such systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, actuating each key one time for each desired letter, and the disambiguation software attempts to predict the intended input. Numerous such systems have been proposed, and while many have been generally effective for their intended purposes, shortcomings still exist.

One such shortcoming arises when the handheld electronic device has a "keypad" in which various diacritical letters are associated with a given key in countries such as, for example, France, Germany and Italy. In the French language, the diacritical letters "è" and "é" may be associated with a single key that displays the letters "E" and "R". When such a key is depressed, the handheld electronic device will typically prefer displaying a non-diacritical letter "e" as the user's first input selection as opposed to the non-diacritical letter "r" and the diacritical letters "è" and "é". There are instances, however, as in the French language, when a user would prefer having a diacritical letter "è" or "é" as the first selection rather than the non-diacritical letter "e".

It would be desirable, therefore, to provide an improved method of enabling input on a handheld electronic device in which the handheld electronic device has the capability of automatically preferring the diacritical letter most likely to be assigned by the user.

BRIEF DESCRIPTION OF THE DRAWINGS

A full understanding can be gained from the following description when read in conjunction with the accompanying drawings in which.

DESCRIPTION

Figure 1:
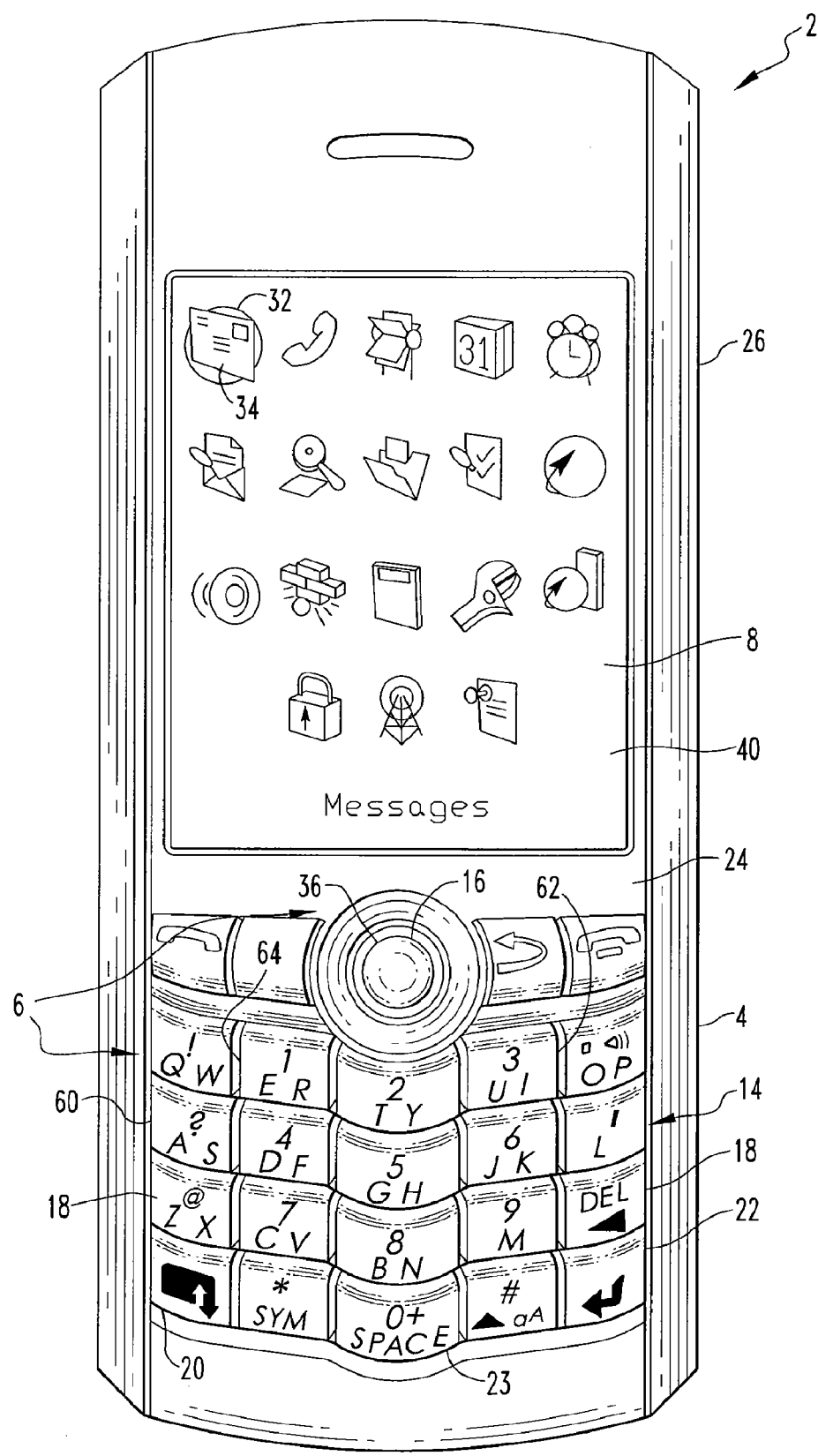
FIG. 1 is a top plan view of an embodiment of the improved handheld electronic device in accordance with the disclosed and claimed concept.

As used herein, the phrase "a number of" or variations thereof means one or an integer greater than one.

As used herein, the phrase "linguistic elements" and variations thereof shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

As used herein, the phrase "text" and variations thereof shall refer broadly to a number of words or a portion of a word.

As used herein, the phrase "alphanumeric" or variations thereof shall broadly refer to a letter, such as a Latin letter, and/or a digit such as, without limitation, 1, 2, 3, 4, 5, 6, 7, 8, 9, 0, and combinations thereof.

When referring to the term "diacritical letters", "diacritical versions", and variations thereof, such designation is meant to cover use of accented characters, uppercase (Majuscule form) of such letters and other diacritical letters.

When referring to the term "reduced" and variations thereof in the context of a keypad, or other arrangement of input members, such designations shall refer broadly to an arrangement in which at least one of the input members has assigned thereto a plurality of linguistic elements such as, for example, characters in the set of Latin letters.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

One embodiment of a handheld electronic device 2 in accordance with the disclosed and claimed concept is depicted generally in FIG. 1. The handheld electronic device 2 of FIG. 1 is depicted schematically in FIG. 2. The handheld electronic device 2 includes a housing 4 upon which are disposed a processor unit that includes an input apparatus 6, an output apparatus 8, a processor 10, a memory 12, and a wireless transceiver 13. The processor 10 may be, for instance, and without limitation, a microprocessor (μP) and is responsive to inputs from the input apparatus 6 and provides output signals to the output apparatus 8. The processor 10 also interfaces with the memory 12 which, as will be discussed in greater detail below, contains one or more routines that are used to implement the disclosed and claimed concept. The processor 10 and the memory 12 together form a processor apparatus.

Referring to FIG. 1, the input apparatus 6 includes a keypad 14 and a navigational input member 16. The keypad 14 is in the exemplary form of a reduced QWERTY keyboard including a plurality of keys 18 that serve as input members. Many of the keys 18 each have a plurality of characters assigned thereto. The keypad 14 also includes an <ALT> key 20, an <ENTER> key 22, and a <SPACE> key 23. It is noted, however, that the keypad 14 may be of other configurations, such as an AZERTY keyboard, a QWERTY keyboard, a QWERTZ keyboard or another keyboard arrangement, whether or not reduced, and whether presently known or unknown.

The keys 18 are located on a front face 24 of the housing 4, and the navigational input member 16, which is in the exemplary form a trackball 36, is disposed on the front face 24 of the housing 4 as well. The trackball 36 is rotatable in various directions thereby allowing for the navigation of the cursor 32, which is displayed on the output apparatus 8, in various directions including up, down, left, right, and any combination thereof. Moreover, the trackball 36 can also be depressed to provide a selection or other input based upon the current location of the cursor 32. Accordingly, rotation of the trackball 36 can navigate the cursor 32 over a particular program icon 34, while depression of the trackball 36 can launch the program. It should be noted that a trackwheel (not shown), which can be disposed on a side 26 of the housing 4, can be used in lieu of the trackball 36. Similar to the trackball, the trackwheel can serve as input member since the trackwheel is capable of being rotated in a clockwise or a counterclockwise direction as well as being depressed. Rotation of the trackwheel can provide a navigation or other input, while depression of the trackwheel can provide a selection or other input. For example, if a cursor 32 is located over a given program icon 34, that program will be launched when the trackwheel is depressed.

Figure 2:
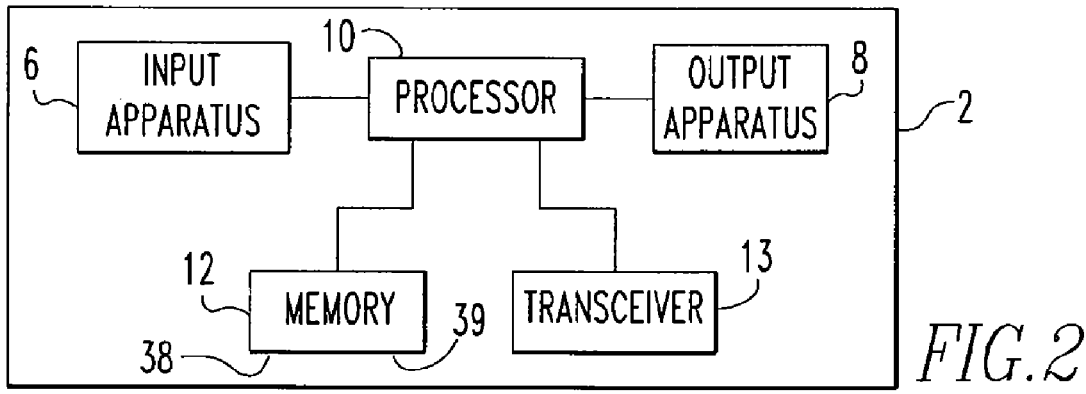
FIG. 2 is a schematic depiction of the handheld electronic device of FIG. 1.

Referring to FIG. 2, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 38 for the processing of data. The routines 38 can be in any of a variety of forms such as, without limitation, software, firmware, and the like.

The output apparatus 8 includes a display 40 upon which can be provided an output 42. A number of exemplary outputs 42 are depicted on the display 40 in FIGS. 3-5. Each exemplary output 42 includes a text component 44 and a variant component 46. As can be seen from these figures, the variant component 46 extends substantially horizontally across the display 40. This, however, is not meant to be limiting since the variant component 46 can also extend across the display 40 substantially vertically or can be otherwise disposed. Preferably, the variant component 46 is located generally in the vicinity of the text component 44. The variant component 46 includes a predetermined quantity of selectable outputs from which the user can select. The variant component 46 includes a selection box 48 that appears in a default position 50. Initially, the default position 50 of the selection box 48 surrounds and/or highlights a preferred output 52 while the remainder of the variant component 46 displays various alternative outputs 54. The selection box 48 is capable of being moved (i.e., shifted) from the default position to a number of other positions 56 by depressing or actuating a number of keys 18 or by rotating the navigational input 16. By moving the selection box 48 to surround and/or highlight the alternative outputs 54, the user is able to select any one of the various alternative outputs 54 for possible output on the output apparatus 8 of the handheld electronic device 2. The display 40 also includes a caret (cursor) 58 in the text component 44 which depicts generally where the next output will be displayed.

As stated above, a shortcoming arises when a handheld electronic device has a "keypad" in which a non-diacritical letter as well as one or more diacritical letters is assigned to a given key. Because the handheld electronic device may prefer the non-diacritical letter as opposed to the diacritical letters, the user of the handheld electronic device can often find himself or herself taking additional actions to select the desired diacritical letters, thereby decreasing the amount of information that the user can enter into the handheld electronic device over a given amount of time.

The disclosed concept enables the handheld electronic device 2 to overcome this shortcoming by having a routine 38 that is adapted to prefer a particular output, such as a diacritical letter or a non-diacritical letter, by employing a language rule set and/or a language word list that is stored in the memory 12 of the handheld electronic device 2. Specifically, when the handheld electronic device 2 detects an actuation of a key 18 that is assigned both a non-diacritical version as well as a diacritical version of a letter, the handheld electronic device 2 will utilize a linguistic source 39 to determine which version of the letter the handheld electronic device 2 will output as the preferred output 52.

Figure 3:
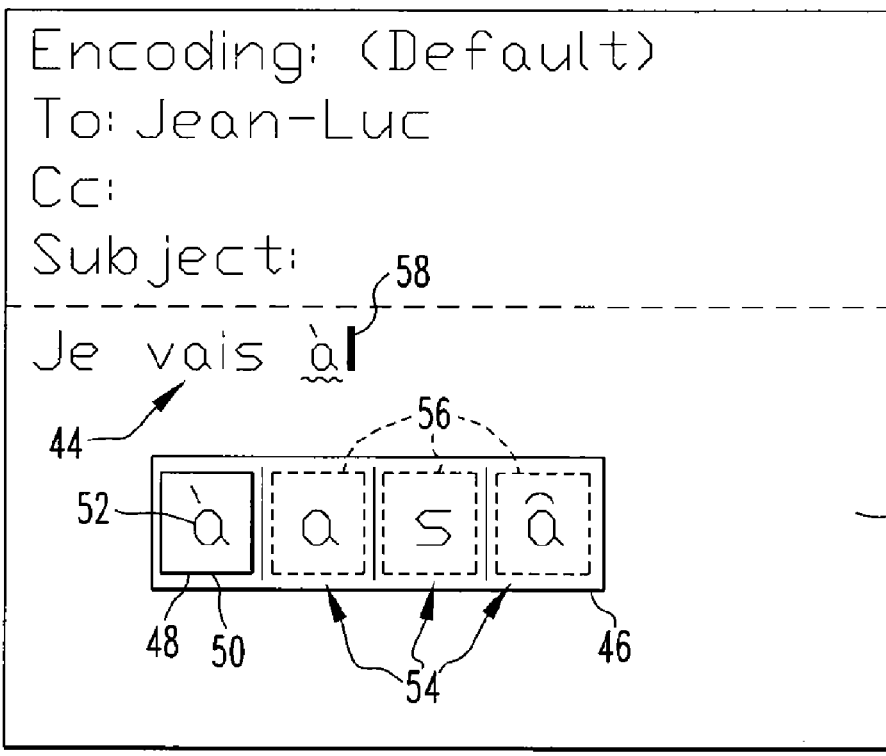
FIG. 3 depicts an output that can be generated on the handheld electronic device of FIG. 1.
Figure 4:
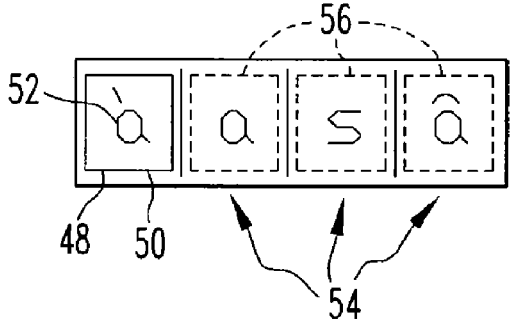
FIG. 4 depicts another output that can be generated on the handheld electronic device of FIG. 1.
Figure 5:
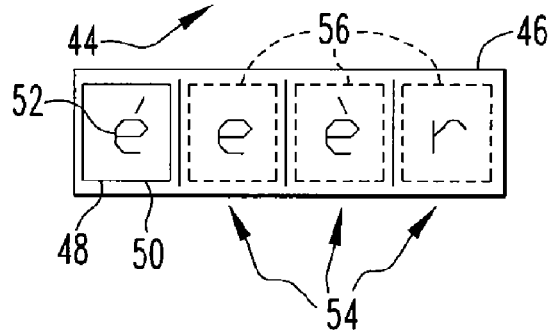
FIG. 5 depicts yet another output that can be generated on the handheld electronic device of FIG. 1.

By way of example, referring to FIGS. 3-5, when the handheld electronic device 2 detects an actuation of a key 18 that is assigned both a non-diacritical and a diacritical version of a letter, the handheld electronic device 2 will automatically output, as the preferred output, the version of the letter that is most appropriate for the current situation. It should be noted that the text that appears in FIGS. 3-5 is in French for illustrative purposes. The disclosed concept, however, could also be applied to other languages, such as German, which use diacritical marks as well.

Referring to FIG. 3, in this figure the user of the handheld electronic device 2 has already entered the phrase "Je vais" into the handheld electronic device 2. Upon detecting the actuation of the key 60 that is assigned the non-diacritical letters "A" and "S" as well as the diacritical letters "à" and "â", the handheld electronic device 2 will utilize the linguistic source 39, which can be a language rule set and/or a language word list, to determine whether the device should output one of the diacritical letters as the preferred output. Moreover, if the handheld electronic device 2 does determine that one of the diacritical letters should be output as the preferred output, then the handheld electronic device 2 will further utilize the linguistic source 39 to further determine which diacritical letter should be the preferred output 52. In this particular instance, the handheld electronic device 2 will output, as the preferred output 52, the diacritical letter "à" since this diacritical letter is the most appropriate letter from among the different possible outputs to display as the preferred output in view of the text (the phrase "Je vais") that was entered prior to the handheld electronic device 2 detecting the actuation of the key 60 that is assigned the letter "A". This is due to the fact that the text preceding the actuation of the key 60 that is assigned the letter "A" is "Je vais" which is a verb that belongs to a particular class. Specifically, "Je vais" belongs to the class of motion verbs. The handheld electronic device 2 will, therefore, prefer the diacritical letter "a" as the preferred output 52 because "Je vais" has this predetermined characteristic. Additionally, the handheld electronic device 2 will output, as the alternative outputs 54, the non-diacritical letters "a" and "s" as well as the diacritical letter "â".

If, however, the handheld electronic device 2 detects another actuation of a key 18 that is assigned a letter (e.g., the key 62 that is assigned the letter "U"), then the handheld electronic device 2 will, again, utilize the linguistic source 39 to determine whether the diacritical letter "à" should be replaced with either the non-diacritical letter "a" or the other diacritical letter "â". For example, if the handheld electronic device 2 detects an actuation of the key 62 that is assigned the letter "U" after the handheld electronic device 2 has output the diacritical letter "à", then the handheld electronic device 2 will employ the linguistic source 39 to determine whether the diacritical letter "à" should be replaced with another letter. Upon referencing the linguistic source 39, the handheld electronic device 2 will automatically replace the diacritical letter "à" with the non-diacritical letter "a" in addition to outputting the letter "u" after the non-diacritical letter "a" because the phrase "au" (as opposed to àu) is a proper phrase in the French language.

Referring to FIG. 4, in this figure the user has already entered the phrase "J'espére que tu seras l" into the handheld electronic device 2. As with the previous figures, when the handheld electronic device 2 detects the actuation of the key 60 that is assigned the non-diacritical letters "A" and "S" as well as the diacritical letters "à" and "â", the handheld electronic device 2 will utilize the linguistic source 39 to determine whether the device should output one of the diacritical letters as the preferred output 52. Using the techniques that are described elsewhere herein, the handheld electronic device 2 will output, as the preferred output 52, the diacritical letter "à" since this diacritical letter is the most appropriate letter from among the different possible outputs to display as the preferred output in view of the text (the phrase "J'espére que tu seras l") that was entered prior to the handheld electronic device 2 detecting the actuation of the key 60 that is assigned the letter "A". Additionally, the handheld electronic device 2 will output, as the alternative outputs 54, the non-diacritical letters "a" and "s" as well as the diacritical letter "â".

Referring to FIG. 5, in this figure the user of the handheld electronic device 2 has already entered the phrase "Avoir l'amabilit" into the handheld electronic device 2. Upon detecting the actuation of the key 64 that is assigned the non-diacritical letters "E" and "R" as well as the diacritical letters "è" and "é", the handheld electronic device 2 will utilize the linguistic source 39 to determine whether the device should output one of the diacritical letters as the preferred output 52. Using the techniques that are described elsewhere herein, the handheld electronic device 2 will prefer, as the preferred output 52, the diacritical letter "é" since in this situation the diacritical letter "é" would be the most appropriate letter to output in view of the text (the phrase "Avoir l'amabilit") that was entered into the handheld electronic device 2 prior to the handheld electronic device 2 detecting the actuation of the key 64 that is assigned the letter "E". Accordingly, the handheld electronic device 2 will output, as the alternative outputs 54, the non-diacritical letters "e" and "r" as well as the diacritical letters "è".

In one embodiment, the linguistic source 39 corresponds to the operative language of the handheld electronic device. For example, if the operative language of the handheld electronic device 2 is French, then the handheld electronic device would use a French linguistic source 39.

Figure 6:
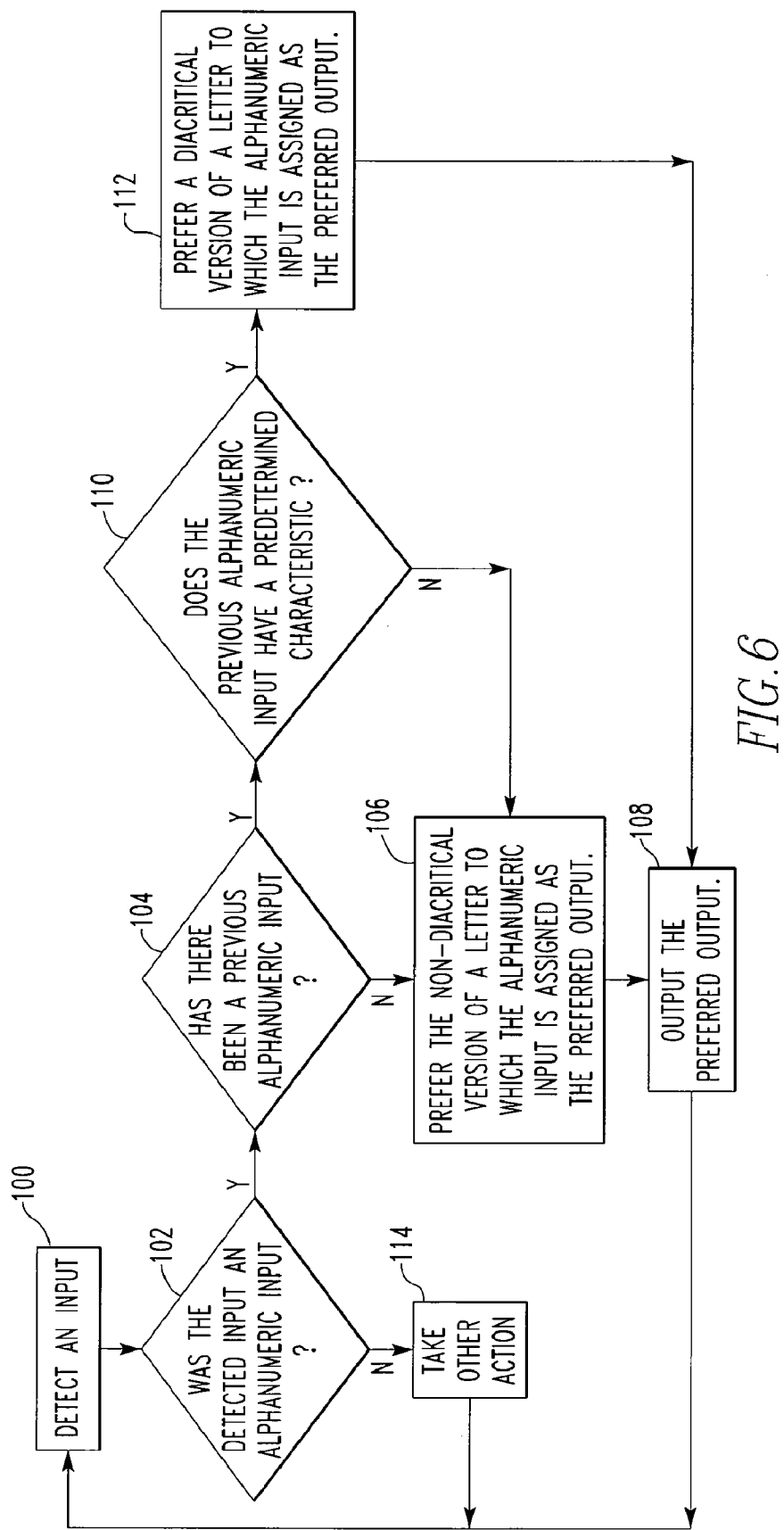
FIG. 6 is a flowchart depicting one embodiment of an improved method in accordance with the disclosed and claimed concept.

FIG. 6 is a flowchart depicting one embodiment of the disclosed concept. As can be seen from this figure, the handheld electronic device 2 will detect, at step 100, an input. The handheld electronic device will then determine, at step 102, whether the detected input was an alphanumeric input.

If the handheld electronic device 2 does determine that the detected input was an alphanumeric input, then the handheld electronic device 2 will determine, at step 104, whether there have been any previous alphanumeric inputs (i.e., text) entered into the device. If the handheld electronic device 2 determines that there have been no previous alphanumeric inputs, then the handheld electronic device 2 will prefer, at step 106, the non-diacritical version of a letter to which the alphanumeric input is assigned as the preferred output 52. The handheld electronic device 2 will then output, at step 108, the preferred output 52 which, in this case, is the non-diacritical version of the letter to which the alphanumeric input is assigned. After the preferred output 52 has been displayed, the handheld electronic device 2 will return to step 100.

Alternatively, if the handheld electronic device 2 does determine that there has been a previous alphanumeric input, then the handheld electronic device 2 will determine, at step 110, whether the previous alphanumeric input has a predetermined characteristic by using the linguistic source. If the handheld electronic device 2 determines that the previous alphanumeric input does not have a predetermined characteristic, then the handheld electronic device will proceed to step 106.

If the handheld electronic device 2 does determine that the previous alphanumeric input has a predetermined characteristic, then the handheld electronic device 2 will prefer, as the preferred output 52, a diacritical version of the letter to which the alphanumeric input is assigned at step 112. After the handheld electronic device 2 has preferred the diacritical version of the letter as the preferred output 52, the handheld electronic device 2 will then output, at step 108, the preferred output prior to returning to step 100.

If the handheld electronic device 2 determines, at step 102, that the detected input was not an alphanumeric input, then the handheld electronic device 2 will take some other action, at step 114, such as, without limitation, determining whether the detected input was a selection input prior to returning to step 100.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device, the handheld electronic device including an input apparatus, an output apparatus, and a linguistic source stored on a memory, the input apparatus having a number of keys, including one or more keys each having at least one non-diacritical version of a linguistic element assigned thereto and at least one diacritical version of the linguistic element assigned thereto, the method comprising:
    detecting selection of one of the keys;
    based at least in part on the detection of the key selection, determining whether to output (i) a non-diacritical version of a linguistic element assigned to the selected key or (ii) a diacritical version of the linguistic element assigned to the selected key in response to the selection, the determination comprising:
        determining whether the selection corresponds to a first alphanumeric input for the enabled input,
        based upon a determination that the selection corresponds to the first alphanumeric input for the enabled input, determining to output the non-diacritical version of the linguistic element assigned to the selected key, and
        based upon a determination that there have been previous alphanumeric inputs for the enabled input, determining whether to output the non-diacritical version or the diacritical version of the linguistic element based on whether the previous alphanumeric inputs satisfy a predetermined condition; and
    outputting the determined output using the output apparatus.

2. The method according to claim 1, further comprising:
    detecting a number of additional key selections and, responsive thereto, updating the determined output based on the detected number of additional key selections.

3. The method according to claim 1, further comprising detecting an operative language of the handheld electronic device, wherein determining whether to output the non-diacritical version or the diacritical version is at least in part based on the detected operative language.

4. The method according to claim 3, further comprising determining that the operative language is French.

5. The method according to claim 4, further comprising outputting as the determined output a diacritical version of a linguistic element used in French that corresponds with the enabled input.

6. The method according to claim 3, further comprising determining that the operative language is German.

7. The method according to claim 6, further comprising outputting as the determined output a diacritical version of a linguistic element used in German that corresponds with the enabled input.

8. The method according to claim 1, further comprising outputting another output as an alternative to the determined output selectable by a user.

9. The method according to claim 1, wherein the determined output is identified based on a verb of a certain class.

10. A handheld electronic device, comprising:
    a number of keys, including one or more keys each having at least one non-diacritical version of a linguistic element assigned thereto and at least one diacritical version of the linguistic element assigned thereto;
    a display;
    a processor apparatus comprising a processor and a memory in electronic communication with one another, said processor apparatus having stored therein a linguistic source and a number of routines which, when executed on said processor, cause said handheld electronic device to perform operations comprising:
        detecting selection of one of the keys;
        based at least in part on the detection of the key selection, determining whether to output (i) a non-diacritical version of a linguistic element assigned to the selected key or (ii) a diacritical version of the linguistic element assigned to the selected key in response to the selection, the determination comprising:
            determining whether the selection corresponds to a first alphanumeric input for the enabled input,
            based upon a determination that the selection corresponds to the first alphanumeric input for the enabled input, determining to output the non-diacritical version of the linguistic element assigned to the selected key, and
            based upon a determination that there have been previous alphanumeric inputs for the enabled input, determining whether to output the non-diacritical version or the diacritical version of the linguistic element based on whether the previous alphanumeric inputs satisfy a predetermined condition; and
        outputting the determined output using the output apparatus.

11. The handheld electronic device according to claim 10, wherein the number of routines cause the handheld electronic device to perform operations further comprising detecting additional key selections and, responsive thereto, updating the determined output based on the detected number of additional key selections.

12. The handheld electronic device according to claim 10, wherein the number of routines cause the handheld electronic device to perform operations further comprising detecting an operative language of the handheld electronic device, wherein determining whether to output the non-diacritical version or the diacritical version is at least in part based on the detected operative language.

13. The handheld electronic device according to claim 12, wherein the operative language is French.

14. The handheld electronic device according to claim 13, wherein the number of routines cause the handheld electronic device to perform operations further comprising outputting as the determined output a diacritical version of a linguistic element used in French that corresponds with the textual input.

15. The handheld electronic device according to claim 12, wherein the operative language is German.

16. The handheld electronic device according to claim 15, wherein the number of routines cause the handheld electronic device to perform operations further comprising outputting as the determined output a diacritical version of a linguistic element used in German that corresponds with the textual input.

17. The handheld electronic device according to claim 10, wherein the number of routines cause the handheld electronic device to perform operations further comprising outputting another output as an alternative to the determined output selectable by a user.

18. The handheld electronic device according to claim 10, wherein the determined output is identified based on a verb of a certain class.

\* \* \* \* \*